United States Patent
Liu et al.

(10) Patent No.: US 11,893,411 B2
(45) Date of Patent: Feb. 6, 2024

(54) SYSTEM AND METHOD FOR RESOURCE OPTIMIZED INTELLIGENT PRODUCT NOTIFICATIONS

(71) Applicant: VMware, Inc., Palo Alto, CA (US)

(72) Inventors: Sifan Liu, Shanghai (CN); Yang Yang, Shanghai (CN); Yu Wu, Shanghai (CN); Jin Feng, Shanghai (CN); Chen Jing, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 335 days.

(21) Appl. No.: 17/329,622

(22) Filed: May 25, 2021

(65) Prior Publication Data

US 2022/0382573 A1    Dec. 1, 2022

(51) Int. Cl.
*G06F 9/455*  (2018.01)
*G06F 8/65*  (2018.01)
*G06N 20/00*  (2019.01)

(52) U.S. Cl.
CPC ............ *G06F 9/45558* (2013.01); *G06F 8/65* (2013.01); *G06N 20/00* (2019.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2019/0163912 A1* | 5/2019 | Kumar | H04L 9/0891 |
| 2020/0007655 A1* | 1/2020 | Namiranian | H04W 76/23 |
| 2021/0173709 A1* | 6/2021 | Rusev | G06F 9/5005 |

* cited by examiner

*Primary Examiner* — Craig C Dorais
(74) *Attorney, Agent, or Firm* — King Intellectual Asset Management

(57) ABSTRACT

The disclosure provides automated update notifications. Embodiments include receiving, by a cloud provider, a request to manage updates for a computing device communicating with the cloud provider via a network. Embodiments include registering an agent at the computing device with the cloud provider as a recipient for an automated update notification based on configuration details of the computing device and detection of an update item related to an aspect of the configuration details. Embodiments include identifying, by the agent, the configuration details of the computing device, the configuration details comprising details of a hardware configuration of the computing device and a software configuration of the computing device. Embodiments include monitoring one or more databases for the update item. Embodiments include transmitting the automated update notification to the agent based on detection of the update item in the one or more databases.

20 Claims, 6 Drawing Sheets

```
600
602  s_items = {}  # key: hardware_device_id, value: a list of s_item
     if new_hardware:
       s_item = <cluster_uuid, email_list, hardware_device_id>
604    if new_hardware.hardware_device_id in s_items:
         # already subscribed, check if there's an entry of the cluster
         if not s_item in s_items[new_hardware.hardware_device_id]:
           s_items[new_hardware.hardware_device_id].append(s_item)
         Skip send subscription request to server
       else:
         s_items[new_hardware.hardware_device_id] = [s_item]
         sendSubscriptionRequest(s_item)
     if remove_hardware:
       s_item = cluster_uuid + email + hardware_device_id
606    items = s_items[remove_hardware.hardware_device_id]
       if len(items) == 1 and items == [s_item]:
         # means the removed device only in-used by current cluster, so it can be
         unsubscribed
         sendUnsubscriptionRequest(s_item)
         s_items.remove(remove_hardware.hardware_device_id)
       else:
         # the hardware device is still used by another cluster, just remove the entry from
         cache, and no need to send request to server
         Items.remove(s_item)
```

FIG. 6

SYSTEM AND METHOD FOR RESOURCE OPTIMIZED INTELLIGENT PRODUCT NOTIFICATIONS

BACKGROUND

A software-defined data center (SDDC) may comprise a plurality of hosts in communication over a physical network infrastructure. Each host is a physical computer (physical machine) that may run one or more virtualized endpoints such as virtual machines (VMs), containers, and/or other virtual computing instances (VCIs) (referred to herein interchangeably as VCIs). In some cases, VCIs are connected to software-defined networks (SDNs), also referred to herein as logical overlay networks, which may span multiple hosts and are decoupled from the underlying physical network infrastructure.

The hosts, physical computers, and/or VCIs (collectively referred to as machines) may comprise various hardware components and execute one or more programs, operating systems, virtualized entities, or the like (collectively referred to as software components) that provide various features, functionality, and/or services to various users, such as clients and end users. Over time, developers and users may generate one or more of software updates, firmware updates, driver updates, hardware, software, and similar compatibility lists, updated hardware requirements, administrator guides, whitepapers, articles, community forum posts, or the like (collectively referred to as update items) documenting issues, concerns, recommendations, capabilities, features, functionality, and the like that machine administrators may find interesting. For example, virtualization components, like other programs, undergo lifecycle events or have communities that develop tools and articles regarding the hardware and/or software components (collectively referred to as components). Such events or community developments, which may occur as updates to or exist as knowledge base information for the components, are commonplace and may occur multiple times throughout a component's lifecycle.

Clients that use the machines or software components may manually search for and identify relevant update items. In some instances, the machine manufacturers or software component developers may provide some information regarding the update items, such as available updates or newly generated documentation. However, it is difficult for administrators to identify all potentially relevant update items, especially for complex systems, that the administrators work with or manage. For example, an administrator of a SDDC may manage a complex hardware system including many hardware components and software components, including processing equipment, storage controllers, storage devices, networking devices, and the like. Each of these components may be associated with their own software updates, such that the complex hardware system may be associated with many update items. Where the administrator must manually identify the update items, the administrator may not identify one or more of the update items before a failure or issue arises that could have been prevented with the components of the SDDC.

Such a failure may leave the SDDC in an undesirable state or condition. For example, hardware manufacturers and/or software developers (collectively referred to as manufacturers) may generate update items to ensure predictable performance and availability of management applications and services. Incompatible hardware or software component version information can affect performance or even cause issues such as data loss. Thus, administrators may wish to take action immediately upon creation or update of corresponding update items to ensure continued compatibility between hardware and software components of the SDDC.

Because creation or updating of update items is abundant, and because interaction with and use of technologies that operate based on or utilize hardware and software components associated with the update items are only increasing, the need and importance of maintaining the hardware and software components with respect to the update items cannot be ignored. Accordingly, there is a need in the art for efficiently providing the administrators of systems of hardware and software components with corresponding update items to maintain the systems and to reduce failures or issues from lack of maintenance.

BRIEF DESCRIPTION OF THE DRAWINGS

FIG. 6 depicts pseudocode that enables a notification management system (NMS) to add or remove hardware components from a notification subscription list, according to embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
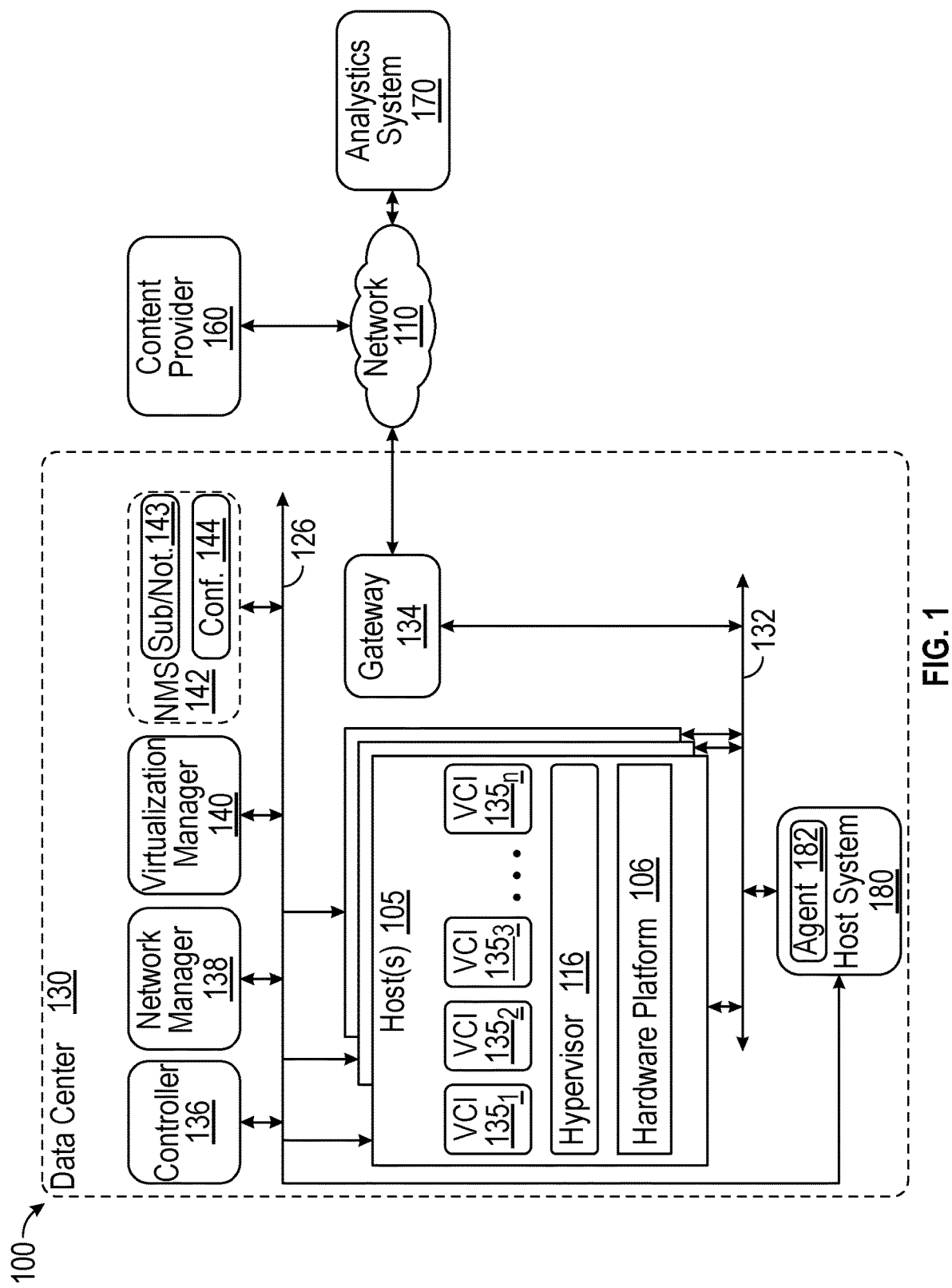
FIG. 1 depicts example physical and virtual network components of a networking environment with which embodiments of the present disclosure may be implemented.

The present disclosure provides an approach and framework for an update item notification subscription service that provides timely notifications about update items related to software and hardware components of systems and the like. In particular, techniques and aspects described herein allow a user, such as a system administrator, to receive timely notifications regarding update items for components of the system.

In certain embodiments, the administrators manage computing systems comprising a plurality of hardware and software components. Each of these components may have corresponding update items for which timely receipt of notifications informing of the update items is important. The administrator of a system may identify details for the hardware and software components, such as manufacturer, product identifiers, version information, and the like, and request update items or subscribe to notifications for update items from each manufacturer, and so forth. However, where the system includes dozens or hundreds of components, each potentially having its own update item(s), such a process being performed manually by the administrator can be unreasonably resource intensive and error prone. For example, subscribing to update item notifications may involve the administrator identifying relevant update items, etc., based on details of the hardware and software components and configuration details of the components and the system. In some embodiments, subscribing to update item notifications further involves the administrator identifying relevant update items, etc., based on network component and configuration details of the system. As described herein, discussion regarding hardware and software component and configuration details can include network component and configuration details, even if not explicitly recited as such. As the system becomes more complex, the process of identifying and subscribing to individual update items or corresponding notifications may be less reasonable for an administrator to manage. Furthermore, subscription mechanisms provided by manufacturers and third parties may provide overly comprehensive content that the administrator must review and parse for portions relevant to the host system. Additionally, in view of increased evolution of hardware and software components, the process of maintaining the system with respect to update items may become more complicated than the administrator can handle.

For example, a system, such as a hyperconverged infrastructure (HCI) management system of a SDDC (e.g., a management plane, control plane, virtualization manager, etc.), may utilize storage controllers, storage devices, networking devices, and/or other components. For a particular system, particular types, versions, performance levels, etc., of components may be needed, and components that are compatible with the system may be identified on a hardware compatibility list (HCL) associated with the system. For example, the system may require that a storage used, for example, have a minimum size, read time, write time, etc. The HCL may identify specific hardware and driver/firmware to be used with the hardware that are known to provide predictable performance for the system. Incompatible hardware or driver/firmware versions may reduce performance or even cause data path issues (collectively referred to as issues), such as data loss in the system. Because of the potential of serious risks or reduced performance of the system as aspects of the components or configuration of the system change, the timely notice of update items that affect the HCL to administrators is critical to enabling administrators to take appropriate actions in view of the update items to avoid or minimize issues for the system. For example, an update item may indicate that an upgrade to software running in the system may cause changes to the HCL that the administrator should be aware of, such that the administrator can ensure that the system components still conform to the HCL, for example, by updating system components to utilize only components founds on the HCL.

In the example instance, the administrator may have to manually access notification subscriptions for each piece of equipment of the system and maintain the notification subscriptions. This may comprise the administrator accessing various manufacturer websites or portals and identifying those notifications relevant to the administrator's system. Further, as components are replaced, decommissioned, or added to the system, the administrator will have to revisit these sites or portals to update item notification subscriptions accordingly, requesting new notifications for the added components and canceling notification subscriptions for replaced or decommissioned components. With such a large number of components to manage, there is risk that those notification subscriptions for all components of the system are not always up-to-date or maintained.

To address such notification subscription issues, the aspects described herein may automatically manage notification subscriptions for systems managed by administrators based on requests by the administrator of a system and identification of the components of the system. For example, the administrators may provide information of the components of the systems, updates to the components, and the like to the notification subscription service. The notification subscription service may enable the administrator to, with one click or request, enable the notification subscription service to automatically collect details of components of the system, identify and generate connections with corresponding subscription systems (for example, for different manufacturers of components, and so forth), and submit the notification subscription requests automatically. For example, for each component, the subscription system may populate a template or the like with the collected component information and use the template to automatically interface with manufacturer websites or portals to automatically select appropriate notifications based on the components of the system. Further, the subscription system, may automatically detect changes to the system, such as the adding and removing of components, and automatically select new appropriate notifications, or unsubscribe from notification that are no longer relevant.

The notification subscription service may provide various benefits, including reducing demands on the administrator regarding update items and corresponding notification subscriptions. For example, the notification subscription service may simplify the notification subscription process for administrators and systems. The notification subscriptions may provide event driven notification subscription updates. The event driven notifications may correspond to notifications provided at events, such as hardware or software component or configuration changes made to the system or newly developed or revised update items that affect the hardware or software components or configuration of the system. Such comprehensive mechanisms and frameworks that enable subscription of notification of update items, as described herein, for hardware and software components do not exist in the prior art.

FIG. 1 depicts example physical and virtual network components of a networking environment 100 with which embodiments of the present disclosure may be implemented.

The networking environment 100 includes a data center 130 connected to a network 110. The network 110 is generally representative of a network of computing entities, such as a local area network ("LAN") or a wide area network ("WAN"), a network of networks, such as the Internet, or any connection over which data may be transmitted between connected computing entities.

The data center 130 generally represents a set of networked computing entities, and may comprise a logical overlay network. The data center 130 includes host(s) 105, a gateway 134, a data network 132, which may be a Layer 3 network, and a management network 126. The data network 132 and the management network 126 may be separate physical networks or different virtual local area networks (VLANs) on the same physical network.

Each of the hosts 105 may be constructed on a server grade hardware platform 106, such as an x86 architecture platform. For example, the hosts 105 may be geographically co-located servers on the same rack or on different racks. Each host 105 is configured to provide a virtualization layer, also referred to as a hypervisor 116, that abstracts processor, memory, storage, and networking resources of the hardware platform 106 into multiple virtual computing instances (VCIs) 1351 to 135n (collectively referred to as VCIs 135 and individually referred to as VCI 135) that run concurrently on the same host 105. The VCIs 135 may include, for instance, VMs, containers, virtual appliances, and/or the like.

The hypervisor 116 may run in conjunction with an operating system (not shown) in the host(s) 105. In some embodiments, the hypervisor 116 can be installed as system level software directly on the hardware platform 106 of the host 105 (often referred to as "bare metal" installation) and be conceptually interposed between the physical hardware and the guest operating systems executing in the virtual machines. In certain aspects, the hypervisor 116 implements one or more logical entities, such as logical switches, routers, etc., as one or more virtual entities, such as virtual switches, routers, etc. In some implementations, the hypervisor 116 comprises system level software as well as a "Domain 0" or "Root Partition" virtual machine (not shown) which is a privileged machine that has access to the physical hardware resources of the host 105. In this implementation, one or more of a virtual switch, virtual router, virtual tunnel endpoint (VTEP), etc., along with hardware drivers, resides in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, containers that run on the host 105 without the use of the hypervisor 116 may replace the VCIs 135, and so forth.

The gateway 134 provides the VCIs 135 and other components in the data center 130 with connectivity to the network 110, and is used to communicate with destinations external to the data center 130, such as an analytics system 170, a content provider 160, and a host system 180. The gateway 134 may be a virtual computing instance, a physical device, or a software module running within the host 105.

The controller 136 generally represents a control plane that manages configuration of the VCIs 135 within the data center 130. The controller 136 may be a computer program that resides and executes in a central server in the data center 130 or, alternatively, the controller 136 may run as a virtual appliance (e.g., a VM) in one of the hosts 105. Although shown as a single unit, it should be understood that the controller 136 might be implemented as a distributed or clustered system. That is, the controller 136 may include multiple servers or virtual computing instances that implement controller functions. The controller 136 is associated with one or more virtual and/or physical CPUs (not shown). Processor(s) resources allotted or assigned to controller 136 may be unique to controller 136, or shared with other components of the data center 130. The controller 136 may communicate with the hosts 105 via the management network 126.

Network manager 138 generally represents components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, the network manager 138 is a computer program that executes in a central server in the networking environment 100, or alternatively, the network manager 138 may run in a VCI 135, e.g., in one of the hosts 105. Although shown as a single unit, the network manager 138 may be implemented as a distributed or clustered system. That is, the network manager 138 may include multiple servers or VCIs that implement management functions. The network manager 138 is configured to receive inputs from an administrator or other entity, e.g., via a web interface or API, and carry out administrative tasks for the data center 130, including centralized network management and providing an aggregated system view for a user.

In an embodiment, the virtualization manager 140 is a computer program that executes in a central server in the data center 130 (e.g., the same or a different server than the server on which the network manager 138 executes), or alternatively, the virtualization manager 140 runs in one of the VCIs 135. The virtualization manager 140 is configured to carry out administrative tasks for the data center 130, including: managing the hosts 105, managing the VCIs 135 running within each host 105, provisioning the VCIs 135, transferring the VCIs 135 from one host 105 to another host 105, transferring the VCIs 135 between data centers 130, transferring application instances between the VCIs 135 or between the hosts 105, and load balancing among the hosts 105 within the data center 130. The virtualization manager 140 may take commands from components located on the management network 126 as to creation, migration, and deletion decisions of the VCIs 135 and application instances on the data center 130. However, the virtualization manager 140 may also make independent decisions on management of local VCIs 135 and application instances, such as placement of the VCIs 135 and application instances between the hosts 105. In some embodiments, the virtualization manager 140 also includes a migration component (not shown) that performs migration of the VCIs 135 between the hosts 105, such as by live migration. In some embodiments, the virtualization manager 140 implements a notification management system (NMS) 142 or provides the services of the NMS 142, which is described in further details below. For example, the virtualization manager 140 may interact with an analytics system 170 and a content provider 160 (introduced in more detail below) to manage update notification subscriptions and corresponding notifications of available update items for hosts with which the virtualization manager 140 interacts without the NMS 142 operating as an intermediary.

The host system 180 may include a configuration of computing hardware and software components, for example, similar to the configuration of the hosts 105. The host system 180 may be managed by an administrator that is responsible for ensuring that the host system 180 and the corresponding hardware and software components and configuration are maintained. The host system 180 may communicate with the analytics system 170 and the content provider 160 via the network 110 and the gateway 134. The host system 180 may implement or support software components, such as an operating system, a web browser, another application, and the like. The hardware and software components of the host system 180 may have individualized update items. Though shown within the data center 130, the host system 180 may exist outside of the data center 130, such as coupled to one or more of the data network 132 or the management network 126. In some embodiments, the host system 180 includes an agent 182 that communicates with an NMS 142 for an automated update item notification, such as based on one or more of the hardware configuration, the software configuration, and the network configuration of the host system 180. The agent 182 may comprise a software or hardware interface that interfaces with the NMS 142 via the network 110. In some embodiments, the NMS 142 provides the automated update item notification to the registered agent 182 based on detection of an update item related to an aspect of one or more of the hardware configuration, the software configuration, or the network configuration of the host system 180. In some embodiments, other hosts 105 of the data center 130 may interface with the NMS 142 via corresponding agents to subscribe to notifications for update items. In some instances, the data center 130 may subscribe to update item notifications for one or more hosts or for other components of the data center based on data available to the data center 130, for example, via the management plane, the control plane, the virtualization manager 140, and the like.

The data center 130 may further comprise the NMS 142. The NMS 142 may generally represent an appliance or similar component of the data center 130 that assists with and manages subscriptions to update items for hardware and software components and configurations of the data center 130 or a component therein, such as the components and configurations of the host system 180, and the like. The NMS 142 also may manage notifications of available update items for the host system 180 based on corresponding details of the hardware and software components and configurations for which a subscription has been registered. The NMS 142 may be a standalone appliance or integrated into one or more other components of the data center 130. For example, a VCI 135 may comprise the NMS 142. Similarly, the virtualization manager 140 may comprise or instantiate the NMS 142.

The NMS 142, as shown, comprises a notification/subscription manager 143 and a configuration manager 144. The notification/subscription manager 143 manages subscription requests and update item notifications for the hardware and software components and configurations of one or more host system 180. Specifically, the notification/subscription manager 143 may manage subscription requests by an administrator of the from host system 180 to subscribe to notifications of update items for or relating to the host system 180. While the discussion below focuses on update item notification subscriptions for the host system 180, one of skill will understand that such discussion applies equally to the entirety of or any component of the data center 130.

For example, the notification/subscription manager 143 may receive a request to register the host system 180 to be notified of or provided with update items relevant to the hardware and software components and configuration of the host system 180 of the data center 130. Registration of the host system 180 may comprise the administrator of the data center 130 adding the host system 180 to a list of subscribed components in the notification/subscription manager 143 and/or providing hardware and software component and configuration details to the notification/subscription manager 143. In some embodiments, the administrator indicates to the notification/subscription manager 143 the component(s) for which the administrator wishes notifications of relevant update items, and the notification/subscription manager 143 may automatically identify the hardware and software components and configuration for the identified components as needed to subscribe to notifications for corresponding update items on behalf of the administrator. Based on the registration information provided, the notification/subscription manager 143 subscribes to notifications of relevant update items for the different hardware and software components such that the host system 180 (and, thus, the data center 130) receives relevant update items, for example, without or with minimal administrator input. In some embodiments, the registration information may include hardware version information, firmware information, software version information, and the like.

As part of managing the subscriptions for the host system 180, the notification/subscription manager 143 may access websites, portals, or the like (collectively referred to as "sites") that provide access to the update items related to the components and configuration of the host system 180. The notification/subscription manager 143 enables the administrator of the host system 180 to register or subscribe for such notifications. The notification/subscription manager 143 may then subscribe to update items for the hardware and software components and configuration relevant to the host system 180 via the site. In some embodiments, the site provides access to the content provider 160, described in further detail below. In some embodiments, the notification/subscription manager 143 manages selecting and subscribing to appropriate update item notifications for the host system 180 such that the host system 180 (or the corresponding administrator) will receive the notifications of update items from the content provider 160.

In some embodiments, the notification/subscription manager 143 may subscribe to the notifications of update items for the host system 180 such that the administrator is notified directly of relevant update items and receives directly the update items from the content provider 160. In some embodiments, the notification/subscription manager 143 may subscribe to the notifications on behalf of the administrator such that the notification/subscription manager 143 acts as an intermediary between the administrator and the content provider 160. As such, the notification/subscription manager 143 may receive the relevant update items from the site (or a corresponding source) and forward the update items to the host system 180 and the administrator. In some embodiments, subscription to notification of update items results in the corresponding update items being provided to the host system 180 (directly or indirectly). Alternatively, subscription to notification of update items results in the host system 180 (directly or indirectly) being provided with notice of the availability of the update item where the host system 180 must obtain the update item itself from the content provider.

The configuration manager 144 may work with the notification/subscription manager 143 and the hardware and software components and configuration of the host system 180 to parse the hardware and software component and configuration details provided by or obtained from the host system 180 or the administrator. In some embodiments, the configuration manager 144 manages obtaining and communicating the component and configuration details between components of the environment 100, such as the analytics system 170 and/or the content provider 160. In some embodiments, the configuration manager 144 manages the components and configuration of the host system 180 such that the configuration manager 144 identifies changes to one or more of the components or configuration of the host system 180 automatically.

The content provider 160 may correspond to a data store for update items. In some embodiments, the content provider 160 corresponds to the manufacturer or third party that provides the update items for the hardware and software components and configurations of systems managed by administrators. In some embodiments, the content provider 160 does not correspond to individual manufacturers and third parties, but instead corresponds to a centralized storage for update items from a plurality of manufacturers and third parties. For example, individual update items for hardware and software components of host system 180 registered with the NMS 142 for update item notification subscriptions may be aggregated and stored in the content provider 160. In some embodiments, the content provider 160 manages subscription workflow and provide notification of any change to update items subscribed to by the administrator to the administrator, for example, via an e-mail message and the like.

The manufacturers may provide updates or upgrades to the hardware components or software components, such as firmware updates, updated hardware compatibility lists, and so forth. The third parties may correspond to the community of users, administrators, or other entities that are not manufacturers of the update items but may still develop content relevant to the host system 180 hardware and software components and configuration, such as articles, blog posts, whitepapers, and the like.

The content provider 160 may provide two categories of update items: mandatory items and recommended items. Mandatory items may correspond to updates that the content provider 160 recommends be applied to the host system 180. In some embodiments, experts of the content provider 160 may identify the mandatory items. In some embodiments, the analytics system 170 may identify the mandatory items based on one or more criteria. For example, the experts or the analytics system 170 identify as mandatory items those update items that, if not applied by the host system 180, may result in serious issues such as data loss at the host system 180, which may include updates to HCLs and the like.

Recommended items may correspond to updates that the content provider 160 identifies as being potentially applicable to the host system 180. In some embodiments, the recommended items may be determined by the analytics system 170 or by another administrator associated with the content provider 160, and the like. For example, the administrator of another host system 180 that obtains update items from the content provider 160 may identify or recommend a particular whitepaper to other administrators with particular system configurations. Thus, if the configuration details of the host system 180 match those of the recommended whitepaper or of the administrator recommending the whitepaper, the content provider 160 or the analytics system 170 may recommend the whitepaper as relevant to the host system 180. Furthermore, the analytics system 170 may recommend items to the host system 180 based on an analysis of current subscription data for systems having overlapping or similar configuration details as the host system 180 and based on an update policy of the host system 180 or the corresponding administrator. For example, the recommended items may require an input or confirmation from the administrator before they are provided to the host system 180.

The analytics system 170 may provide an engine that analyzes the configuration details of the host system 180 and interacts with the NMS 142 and the content provider 160. In some embodiments, the analytics system 170 is a cloud-based computing system accessible by the data center 130, the host system 180, and the content provider 160. For example, the analytics system 170 may correspond to computing resources (for example, including one or more processors and/or computing systems) provided through a private or a public cloud. In some embodiments, the analytics system 170 may refer to a computing system that is dedicated and/or local to data center 130.

In some instances, the analytics system 170 receives and analyzes the components and configuration details of the host system 180 with respect to update items available from the content provider 160. For example, the analytics system 170 receives the components and configuration details for the host system 180 from the NMS 142 (specifically, the configuration manager 144) and identifies the update items that are relevant to the host system 180 from all update items available from the content provider 160, for example, based on version information of the components. Thus, the analytics system 170 is able to determine, based on the host components and configuration details, which update items from one or more content providers 160 may be useful to the administrator of the host system 180 based on the host system 180 components and configuration details. Thus, the analytics system 170 is able to intelligently curate update items to the administrator that may be relevant to the host system 180. Based on this determination, the analytics system 170 can cause the content provider 160 to send a corresponding notification to the administrator that certain update items may be relevant to the host system 180. The administrator may, via the user interface 247, agree or disagree with the recommended or notified update items as indicated in the notification.

In some embodiments, the analytics system 170 analyzes the components and configuration details of the host system 180 with respect to configuration details of other hosts 105 to identify the relevant update items. For example, the analytics system 170 may identify the relevant update items for the host system 180 based on finding that similarly configured host systems subscribed to the relevant update items or found them to be relevant. For example, the analytics system 170 may employ machine learning (ML) or artificial intelligence (AI) algorithms to identify relevant update items for the host system 180. For example, the analytics system 170 may use records of other host systems 180 with similar components and configurations and corresponding update items for the other host systems 180 that also subscribed for notifications of update items from the analytics system 170 to identify update items to recommend for the host system 180.

More specifically, using training datasets generated from the records of other host systems 180, machine learning (ML) models that can recommend relevant update items to the host system 180 for installation and/or application can be trained. In certain embodiments, a trained ML model refers to a function, e.g., with weights and parameters, that is used to generate or predict one or more outputs (such as the recommended relevant update items) for a given set of inputs (such as host or system components and configurations). Various ML algorithms may be used to generate different outputs for a given set of inputs.

The ML algorithms may include one or more of a supervised learning algorithm, an unsupervised learning algorithm, or a semi-supervised learning algorithm, or other similar algorithms. Unsupervised learning draws inferences from datasets consisting of input data without labeled responses. Supervised learning is the ML task of learning a function that, for example, maps an input to an output based on example input-output pairs. Supervised learning algorithms, generally, include regression algorithms, classification algorithms, decision trees, neural networks, and so forth.

In certain aspects, the ML model is a multi-input-multi-output (MIMO) or a multi-input-single-output (MISO) ML model configured to take the certain set of inputs and provide one or more outputs described above. The ML model may be trained using the training datasets based on predicting outputs (for example, the relevant update items) for the corresponding inputs (for example, the other host systems 180 and systems components and configuration) of the training datasets. The predicted outputs of relevant update items generated based on the corresponding inputs can be compared with the actual relevant update items recommended to the previously notified other host systems 180, as indicated in the training data. Specifically, weights of the ML model can be adjusted to minimize an error (or divergence) between the predicted relevant update items and the actual relevant update items for the other host systems 180. As more records from the training datasets are run through the ML model and the weights are adjusted to minimize the above error, the ML model may make accurate predictions with low error rates. This trained ML model can then be deployed to identify relevant update items for the host system 180 based on the components and configuration of the host system 180.

An NMS may provide a host system administrator with a single subscription service or touchpoint that manages update item notifications for the various hardware and software components and configuration of the administrator's host system. The NMS may subscribe the host system for notification of relevant As manufacturers or third parties develop the update items, the NMS may provide receive notification of these update items and direct the received notification or update item to the host system. Further details are provided below.

Figure 2:
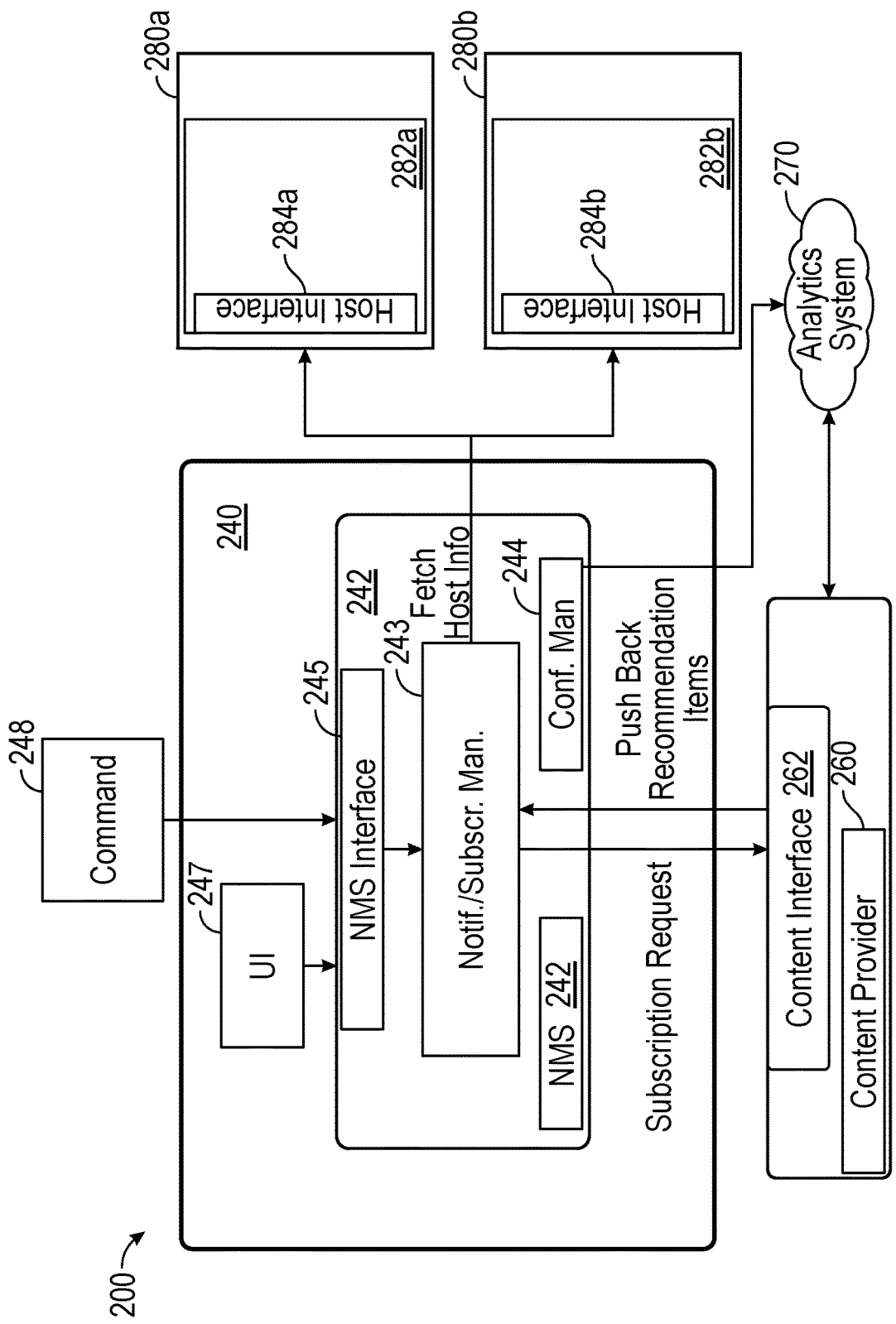
FIG. 2 depicts a block diagram of a design and data flow (collectively referred to as "architecture") for components of the environment of FIG. 1, according to embodiments of the present disclosure.

FIG. 2 depicts a block diagram of a design and data flow (collectively referred to as "architecture") 200 between components of the environment 100 of FIG. 1, according to embodiments of the present disclosure. Specifically, the architecture 200 shows communications and data flows that occur between an NMS 242 (corresponding to the NMS 142) run by the virtualization manager 240 (corresponding to the virtualization manager 140) that communicates with a host system 280a and a host system 280b (corresponding to the host system 180), a content provider 260 (corresponding to the content provider 160), and an analytics system 270 (corresponding to the analytics system 170). The architecture 200 provides subscription notifications regarding the host systems 280a and 280b, for example, to the administrator of the host systems 280a and 280b.

The NMS 242 includes a notification/subscription manager 243 and a configuration manager 244 that correspond to the notification/subscription manager 143 and the configuration manager 144, respectively. The notification/subscription manager 243 communicates with the host systems 280a and 280b via host interfaces 284a and 284b, respectively. The host interfaces 284a and 284b may correspond to any hardware or software component that enables communication of data between the host systems 280a and 280b, respectively, and the NMS 242. In some embodiments, the host interfaces 284a and 284b correspond to host application programming interfaces (APIs).

The notification/subscription manager 243 also communicates with the content provider 260 via a content interface 262 (configured to enable communication of data between two components, similar to the host interfaces 284a and 284b) of the content provider 260. In some embodiments, the content interface 262 corresponds to the sites, for example, of the manufacturer or third party introduced above. In some embodiments, the content interface 262 corresponds to one or more content subscription APIs.

Additionally, the configuration management 244 communicates with the analytics system 270, which also communicates with the content provider 260. Details of the communications and corresponding data flow are provided below.

The architecture 200 is triggered or activated based on a command 248. The command 248 may activate or enable the NMS 242 to manage notification subscriptions for one or more host systems 280. In some embodiments, the architecture 200 receives the command 248 at an NMS interface 245, which may comprise a notification management API that enables the NMS 242 to receive one or more commands. For example, the NMS interface 245 also interacts with a user interface 247 via the NMS interface 245, through which the user interface 247 provides commands and the like to, for example, the notification/subscription manager 243 of the NMS 242.

In some embodiments, an administrator of a system comprising the host systems 280a and 280b activates the NMS 242 to manage update item notification subscriptions for the system. In response, the notification/subscription manager 243 may identify components and configuration details about the host systems 280a and 280b and any other components of the system. The component details may comprise details of the hardware and software components of the host systems 280a and 280b, while the configuration details may comprise how these components are integrated and configured to provide services to the users. The request, and a corresponding response, may occur between the notification/subscription manager 243 and the host interfaces 284a and 284b of management components, or NMS agents 282a and 282b, respectively, installed at the host system 280a. The agents 282a and 282b may correspond to the agent 182 of FIG. 1. Via this host interface 284a, the agent 282a may communicate the component and configuration details, or changes thereto, for the host system 280a to the notification/subscription manager 243. In some embodiments, the component and configuration details for the host system 280a may be provided by the administrator that registers the host system 280a for the update item notifications.

In some embodiments, one of the notification/subscription manager 243 or the configuration manager 244 parses the configuration details received from the host system 280a to identify what update items are relevant to the host system 280a. For example, the particular configuration of the hardware and software components in the host system 280a may enable a first set of features while not enabling a second set of features. Based on the knowledge of the configuration of the host system 280a, the notification/subscription manager 243 or the configuration manager 244 may identify that update items relating to the first set of features are relevant to the host system 280a while update items relating to the second set of features are not relevant to the host system 280a. The notification/subscription manager 243 may then submit a subscription request to the content provider 260, for example, via the content interface 262. In some embodiments, the subscription request identifies details of the hardware and software components that are relevant to the host system 280a. In some embodiments, the subscription request identifies the particular update items for which the host system 280a and the NMS 242 wish to be notified. In response to the subscription request, the content provider 260 may provide notifications of or the update items relating to the subscription request to the notification/subscription manager 243.

In some embodiments, parsing the configuration details received from the host system 280a comprises identifying the component and configuration details of the host system 280*a*, such as appropriate manufacturers or third parties for the hardware and software components of the host system 280*a*. In some embodiments, the configuration manager 244 performs the parsing and provides information to the notification/subscription manager 243 to enable the notification/subscription manager 243 to submit the subscription request to the content provider 260. Furthermore, the configuration manager 244 may provide the configuration details for the host system 280*a* to the analytics system 270. The analytics system 270 may work with the content provider 260 to ensure that appropriate mandatory and recommended update items are provided to the host system 280*a* via the NMS 242, as introduced above.

Figure 3:
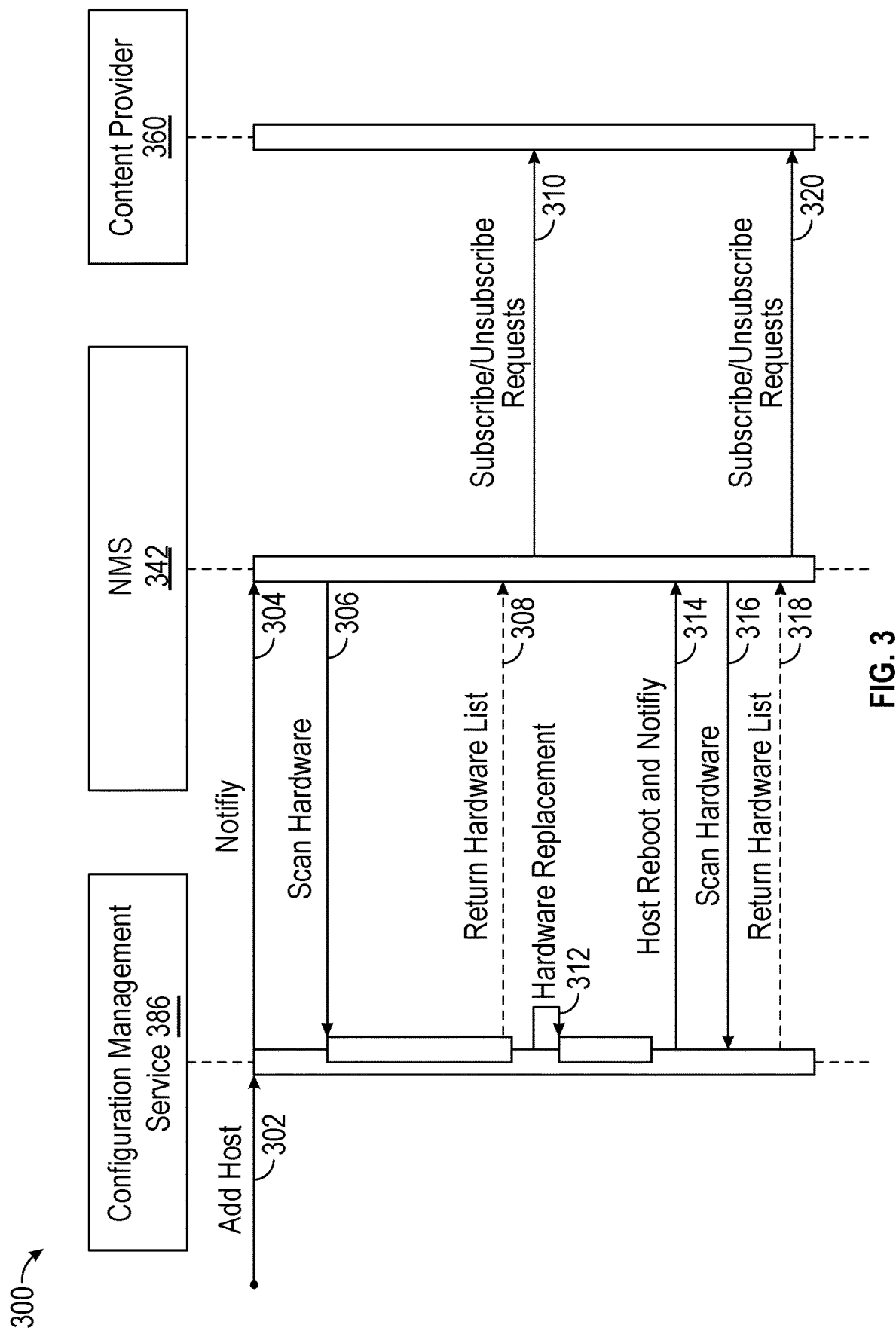
FIG. 3 depicts an example of call flows between the components of FIGS. 1 and 2 for subscribing to and receiving update item notifications for hardware and software components of a system, according to embodiments of the present disclosure.

FIG. 3 depicts an example of call flows between the components of FIGS. 1 and 2 for subscribing to and receiving update item notifications for a hardware and software component host, such as the host system 180 of FIG. 1, according to embodiments of the present disclosure. The call flow diagram 300 includes communication and processing steps between or by a NMS 342 (for example, corresponding to the NMS 142 of FIG. 1), a configuration management service 386 (for example, corresponding to a configuration management service that is provided by an agent, such as the agent 182), and a content provider 360 (similar to the content provider 160). The configuration management service 386 may operate with the agent, for example, on the host and provide details about the hardware and software components and configuration for the host to the NMS 342.

At communication 302, the configuration management service 386 receives an indication to add a host, such as the host system 180, to be notified of or provided with update items related to the host system. In some embodiments, the NMS 342 (for example, via a configuration manager of the NMS 342) receives the communication 302 directly from the configuration management service 386 of the host system, from an administrator, or from similar source. Thus, the NMS 342 receives the request to manage update item notification subscriptions for the host system.

At communication 304, the configuration management service 386 sends a notification notifying the NMS 342 of the host system subscribing to update item notifications. In some embodiments, where the NMS 342 manages multiple host systems, the communication 304 may update the NMS 342 to manage the notification subscriptions for the additional host system indicated or identified in the communication 302.

To effectively manage the notification subscriptions, the NMS 342 (for example, via the notification/subscription manager) requests, for example, hardware details for the host system added at the communication 302. In some embodiments, the hardware details for the host system include configuration information for the host system. Therefore, at communication 306, the NMS 342 may request the configuration management service 386 or the corresponding agent to scan the hardware details of the host system added from the communication 302.

At communication 308, the configuration management service 386, or the agent, provides the hardware details of the host system to the NMS 342 (for example, the notification/subscription manager). In some embodiments, though not shown explicitly, the configuration management service 386 may review configuration details of the host system, for example, received from the host system or scan the host system to identify the hardware details provided at the communication 308.

At communication 310, the NMS 342 subscribes to one or more notifications with the content provider 360 based on the hardware details of the host system. In some embodiments, the NMS 342 parses the hardware details for the host system received from the configuration management service 386. Parsing the hardware details may comprise analyzing the hardware details to identify manufacturers of and specifics of the hardware components of the host system, such as firmware versions, and the like. Based on the manufacturers and specifics of the hardware components, the NMS 342 subscribes to appropriate update item notifications specific to the hardware details of the host system. Though not shown in FIG. 3, the content provider 360 may provide notifications of relevant update items to the NMS 342 based on the subscription request at the communication 310.

At processing 312, the configuration management service 386 identifies a replacement of or change in one or more hardware components in the host system. For example, this identification may be made based on the host system communicating a hardware update or change.

At communication 314, the configuration management service 386 notifies the NMS 342 of the update to the hardware of the host system.

At communication 316, the NMS 342 requests the updated hardware details for the host system from the configuration management service 386, which the agent provides with communication 318.

At 320, the NMS 342 updates the subscription requests for the host system based on the updates to the hardware details of the host system. For example, the NMS 342 removes or unsubscribes the host system from update notifications for hardware components replaced in the host system. For any new hardware component added to the system, the NMS 342 may add a new subscription for the new hardware component with the appropriate manufacturer, and so forth.

Thus, using the call flow diagram 300, the NMS 342 can use the configuration management service 386 to manage update items notifications for the host system on behalf of the administrator. In some embodiments, though the call flow diagram 300 is shown and described relative to hardware components, the call flow diagram 300 can equally apply to any combination of hardware and software components and configuration of the host system. Thus, the call flow diagram 300 may enable automatic tracking of changes to the hardware or software components and configuration of the host system so that the components of the host system are up-to-date. The NMS 342, being event driven (for example, based on changes to the host system or other events that cause or result in a change to the hardware or software components or configuration of the host system), enables the administrator of the host system to manage efficiently update items for an otherwise complex combination of components. The NMS 342 can help the administrator of the host system to avoid missing update items for components of the host system.

In some embodiments, the NMS can provide update item notification subscription services on a cluster level for an administrator. A cluster may comprise a group of one or more hosts (such as the host system 180 of FIG. 1). The cluster has resources that comprise resources of each of the hosts that form the cluster. In some instances, the cluster is configured to manage all of its resources (and, thus, the resources of each of the corresponding hosts). Such clusters may receive cluster-based content via periodic communications with the NMS, for example, via a configuration manager (for example, corresponding to the configuration manager 144). In some embodiments, based on the phoning home, the NMS may provide cluster based content delivery for clusters (comprising one or more host systems) that periodically provide the NMS with hardware and software component configuration details such as production version, firmware, and the like. The cluster based-content delivery provided by the NMS may leverage such information from the clusters or host systems to identify and push the recommended update items to the appropriate cluster(s). For example, if a cluster is a large cluster, the NMS can identify and push update items including knowledge-based articles regarding best practices for managing large-scale clusters. Similarly, if the cluster utilizes or enables advanced services such as encryption, the NMS can provide update items regarding encryption.

In some embodiments, the NMS may employ tags for certain update items, such as white papers, articles, blog posts, and the like, to avoid recommending update items for a cluster to which the update items do not apply. The tags may be applied to the update items in a multi-aspect, or multilayered, approach. For example, the tags may identify information about one or more of a cluster configuration, a type of update item, and version data for components of the cluster to which the update item applies. When the update item includes a tag identifying cluster configuration information, the update item may apply to clusters having the identified cluster configuration, such as a stretched cluster, a larger cluster, an encrypted cluster, and so forth. The tags for the update item may also identify a particular update item provided, such as an article related to a known issue, best practices, a component advisory, and so forth. Furthermore, some update items may utilize tags that identify related product version information, and the like. In some embodiments, the tags may track various other information that can be used to filter update items for notification of the administrator. Thus, when the NMS identifies whether an update item applies to the cluster, the NMS can determine whether any of the tags of the update item apply to the cluster. Thus, the tags can be used to filter update items from being presented to the cluster administrator when the update item does not apply to the cluster.

Figure 4:
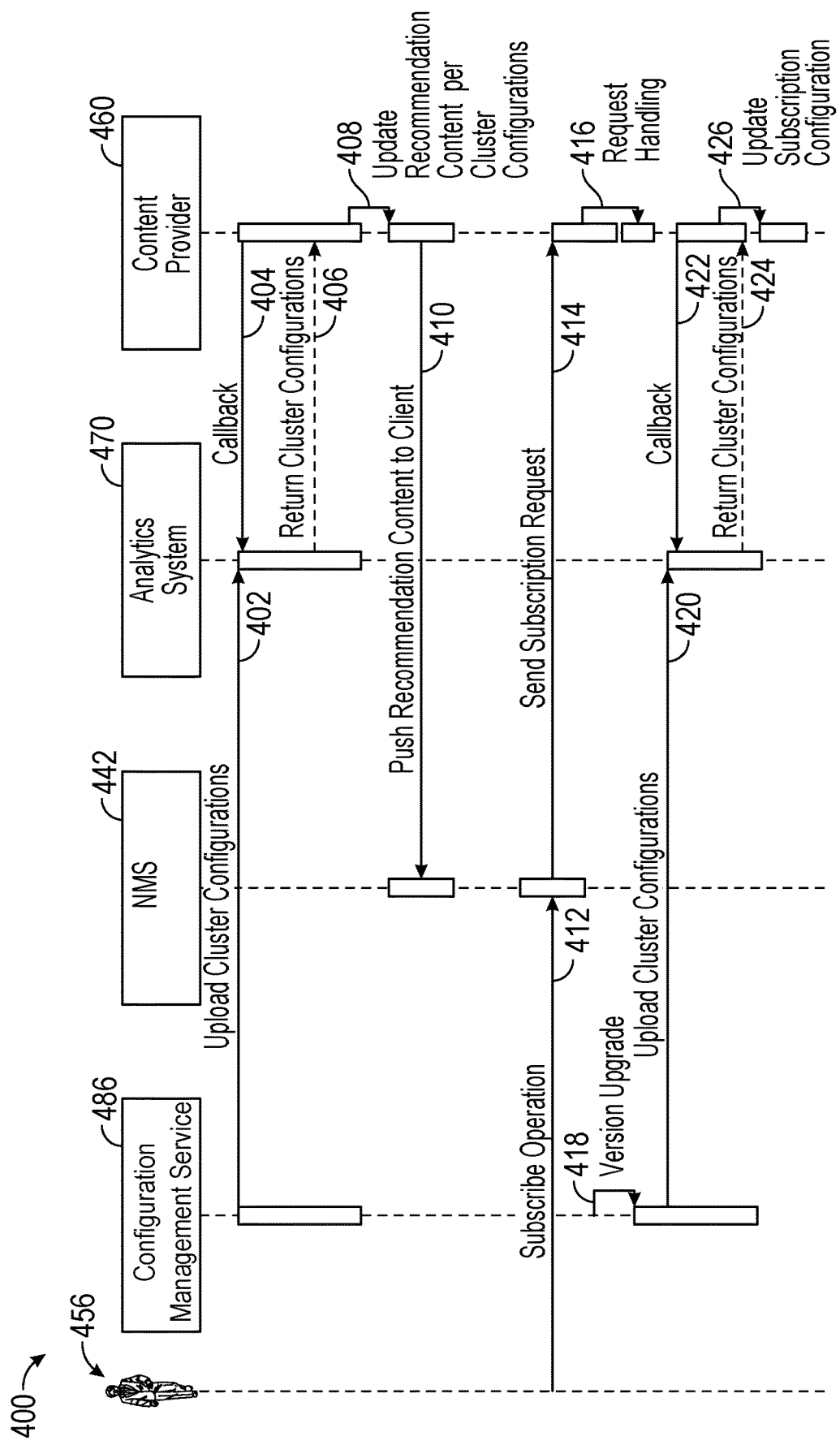
FIG. 4 depicts an example sequence diagram of interactions between the various components of FIG. 1 for subscribing to and updating update item notification subscriptions for a cluster, according to embodiments of the present disclosure.

In some embodiments, the content provider, such as the content provider 160 of FIG. 1, and the NMS 142 update subscription details for a cluster or host system intelligently based on received configuration information. FIG. 4 depicts an example sequence diagram 400 of interactions between the various components of FIG. 1 for subscribing to and updating update item notification subscriptions for a cluster, according to embodiments of the present disclosure. The call flow diagram 400 includes communication and processing steps between or by a configuration management service 486 (for example, the configuration manager service 386, introduced provided by the agent 182 of FIG. 1), a NMS 442 (for example, provided by the NMS 142), and a content provider 460 (corresponding to the content provider 160).

At step 402, the configuration management service 486 provides configuration details for a cluster of host systems (for example, corresponding to the host system 180) to an analytics system 470 (corresponding to the analytics system 170). As introduced above, the configuration details may include details regarding the hardware and software components and configurations of the host systems of the cluster.

At step 404, the content provider 460 may request the cluster configuration details from the analytics system 470. In some embodiments, the content provider 460 may request the cluster configuration details via a callback communication to the analytics system 470.

At step 406, the analytics system 470 may provide the cluster configuration details to the content provider 460.

At step 408, the content provider 460 may identify update items to recommend for the cluster based on the configuration details received at step 406. For example, the content provider 460 may recommend update items specific to a particular version of software or hardware component identified in the configuration details, or a knowledge base article specific to a stretched cluster configuration identified in the configuration details. In some embodiments, the analytics system 470 may process the configuration details to identify recommended update items instead of or in conjunction with the content provider 460.

At step 410, the content provider 460 pushes the identified update items to the NMS 442. Though not shown, the NMS 442 may provide the identified update items to the cluster. In some embodiments, the content provider 460 provides a list of recommended update items to the NMS 442, which may then pass the list to the administrator of the cluster (not shown).

At step 412, the administrator 456 of the cluster reviews the update items or the list of update items and determines to subscribe to one or more of the recommended update items. Such determination may be communicated to the NMS 442.

At step 414, the NMS 442 sends a subscription request to the content provider 460. In some embodiments, the subscription request includes information identifying the corresponding cluster, contact information for the administrator, identified update items to which the subscription request relates, and so forth. In some embodiments, the identified update items include subscription configurations particular update items, such as the multilayer tags, and product updates. As introduced above, the multilayer tags may identify various layers of information for corresponding update items, such as corresponding cluster configuration and KB type.

At step 416, the content provider 460 processes the request from the NMS 442 and subscribes the cluster for the identified update items. In some embodiments, the content provider 460 may review and/or supplement the subscription request based on configuration details for the cluster.

At step 418, the cluster may experience a change, such as a version upgrade.

Based on the change to the cluster, the configuration management service 486 provides updated cluster configuration details to the analytics system 470 at step 420. In some embodiments, the updated configuration details may indicate the change to the cluster, such as the version update.

At step 422, the content provider 460 may request the updated configuration details from the analytics system 470. In some embodiments, the content provider 460 may request the updated cluster configuration details via a callback communication to the analytics system 470.

At step 424, the analytics system 470 may provide the updated cluster configuration details to the content provider 460.

At step 426, the content provider 460 updates the subscriptions created for the cluster at step 416 based on the updated configuration details. For example, the content provider 460 will cease recommending update items relevant to the old version and instead recommend update items relevant to the updated version.

In some embodiments, the analytics system 470 analyze big data to identify, for example, the most subscribed to update items for a particular cluster configuration, the most subscribed to update items for particular hardware or software components, and so forth. Accordingly, the analytics system 470 and the content provider 460 can recommend the corresponding update items to other clusters (and corresponding administrators) having similar or the same configuration details. For example, most administrators of clusters running a software product at version 2.5 choose to update the software product to version 3.0 soon after the version 3.0 release. Based on identifying such a trend, the analytics system 470 or the content provider 460 may use the NMS 442 to notify the administrator 456 managing the cluster with the software product at version 2.5 of the available software update item, even if the administrator has not requested the notification. Thus, the NMS can provide automatic recommendations based on an analysis of the cluster configuration details and big data for corresponding clusters. In some embodiments, the analytics system 470 or the content provider 460 may identify a trend of issues caused by an update item. As such, the NMS 442 may identify the problematic update item to the administrator and recommend against applying the update item.

Figure 5:
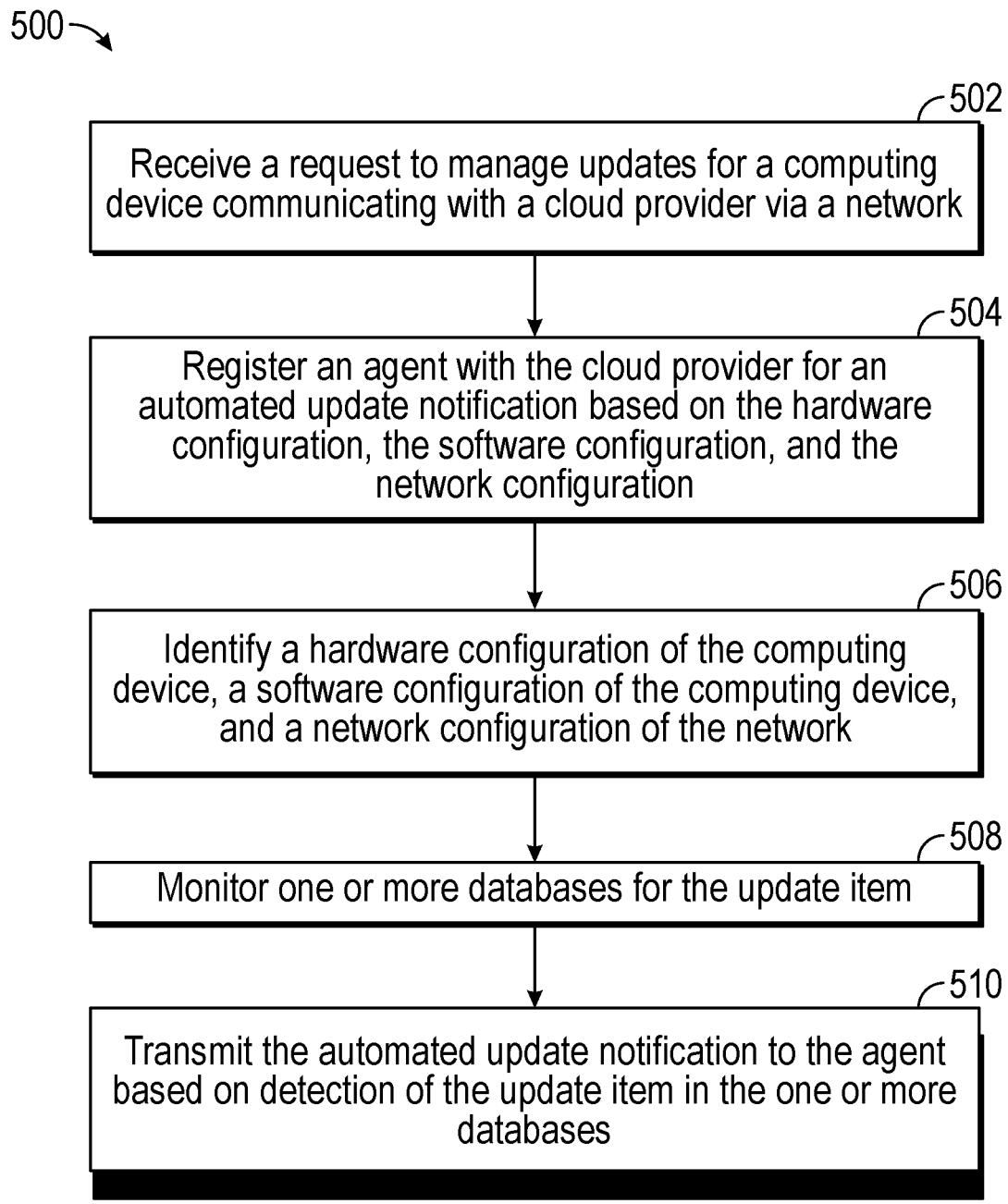
FIG. 5 depicts an example flowchart for a method for employing the software update item notification system of FIG. 2 to manage update item notification subscriptions, according to embodiments of the present disclosure.

FIG. 5 depicts an example flowchart for a method 500 for employing the software update item notification system of FIG. 2 to manage update item notification subscriptions, according to embodiments of the present disclosure. For example, the method 500 may be performed by one or more components of the NMS (for example, the NMS 142 of FIG. 1) as part of steps 302-320 of FIG. 3 and/or steps 402-424 of FIG. 4.

At block 502, the one or more components of the NMS receives a request to manage updates for a host system (for example, the host system 180) via a network (for example, the network 110). The request may comprise an identifier for the host system subscribing for notifications regarding update items. In some embodiments, the notification/subscription manager or the update management service of the NMS may receive the request. In some embodiments, the request to manage updates may be for a cluster or a user device.

At block 504, the one or more components of the NMS registers an agent at the host system with the NMS for an automated update item notification based on the hardware configuration, the software configuration, and the network configuration. In some embodiments, the agent at the host system is optional and the host system may instead communicate directly with the NMS to register for and receive update item notifications.

At block 506, the one or more components of the NMS identifies a hardware configuration of the host system and a software configuration of the host system, for example, by the agent on the host system. In some embodiments, the NMS also identifies a network configuration of the network. The notification/subscription manager or the update management service of the NMS may identify the hardware, software, and/or network configuration. In some embodiments, the NMS may request that the host system provide its hardware, software, and/or network configuration from which the NMS identifies the corresponding configuration(s). In some embodiments, the one or more components of the NMS receives the configuration details of the host system, for example, from the agent.

At block 508, the one or more components of the NMS monitors one or more databases for the update item. The NMS may monitor an individual database that comprises update items for various components, manufacturers, and third parties or multiple databases for multiple components, manufacturers, and third parties. In some embodiments, monitoring the database or databases may comprise generating a trigger when one or more update items are identified in one of the databases.

At block 510, the NMS transmits the automated update item notification to the agent based on detection of the update item in the one or more databases. In some embodiments, the notification may comprise the update item.

A virtualization manager, such as the virtualization manager 140 of FIG. 1, may manage multiple clusters each comprising one or more host systems. In some embodiments, the individual host systems subscribe to notifications for update items with an NMS, such as the NMS 142. In other embodiments, the individual clusters subscribe to notifications with the NMS for corresponding host systems. Where multiple host systems of a single cluster comprise corresponding hardware and software component configurations, managing the notification subscriptions for the update items at the cluster level as opposed to at the host system level may improve efficiencies of communications between and processing of the NMS and a corresponding content provider (such as the content provider 160). For example, when the cluster comprises three host systems with similar hardware and software component configurations, managing the notification subscriptions at the cluster level enables the NMS to manage notification subscriptions for a single hardware and software component configuration as opposed to three different sets of notification subscriptions for each host systems. When the configurations are the same or similar, the NMS manages one-third of the notification subscriptions when managed at the cluster level as compared to the host system level.

In some embodiments, when the NMS manages the notification subscriptions for multiple host systems from a cluster, the NMS may deduplicate the notification subscriptions based on the host systems having the similar configurations and being part of the same cluster. Thus, for the cluster comprising the three host systems with the similar configurations, the NMS may deduplicate two-thirds (66.7%) of the notification subscriptions. Where clusters have more than three host systems, the efficiency savings based on managing the notification subscriptions at the cluster level and performing corresponding deduplicating will be greater than 67% as compared to managing at the host system level. Similarly, the NMS may avoid duplicate subscriptions by determining that the host is already system is already registered for a particular update notification, for example, when a particular update is selected by an administrator, host agent, and the like.

FIG. 6 depicts pseudocode 600 that enables the NMS to add or remove hardware components from a notification subscription list, according to embodiments of the present disclosure. In some embodiments, the NMS may execute the pseudocode.

The pseudocode 600 begins with a pseudocode section 602 that defines a subscription item (s_item), the definition of the subscription item including a cluster identifier, an e-mail list, and a hardware device identifier. The cluster identifier identifies the cluster with which the corresponding subscription is associated. The e-mail list identifies one or more e-mail addresses that will receive a notification for the corresponding subscription, and the hardware device identifier identifies the relevant device for which the notification subscription is requested.

The NMS executing the pseudocode 600 may receive information for a hardware device and an indication whether to add the identified hardware device to a corresponding notification subscription list or remove it from the corresponding notification subscription list. At a pseudocode section 604, the pseudocode 600 provides instructions for determining whether a subscription already exists for an identified hardware device, where the identified hardware device is identified as a new hardware device. If the new hardware device is not already subscribed, then the new hardware device is added to a list of subscribed hardware devices, the list identifying the cluster identifier, the e-mail list, and the hardware device identifier for individual hardware devices for which update item notification subscriptions exist. Where a subscription already exists for the new hardware device, such as when a similar hardware device is already subscribed or the same hardware device is already subscribed, then the pseudocode section 604 skips adding the new hardware to the list.

At a pseudocode section 606, the pseudocode 600 identifies the hardware device to be removed from the list of subscribed hardware devices. Where the hardware device to be removed is used in a single cluster, then the NMS unsubscribes the hardware device and removes it from the list of subscribed hardware devices. Where the hardware device is still used by another cluster, then the NMS may update the list to remove reference to the cluster associated with the hardware device but keep the hardware device on the list of subscribed hardware items. Thus, the list is updated to indicate the hardware device is used in one less cluster.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data, which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments might also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to isolate completely the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to use only a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing automated update notifications, the method comprising:
   receiving, by a cloud provider, a request to manage updates for a computing device communicating with the cloud provider via a network;
   registering an agent at the computing device with the cloud provider as a recipient for an automated update notification based on configuration details of the computing device, wherein the cloud provider provides the automated update notification to the registered agent based on detection of an update item, the update item related to an aspect of the configuration details and comprising one or more of an updated hardware compatibility list, a software update, a firmware update, a driver update, or a new or updated relevant article;
   identifying the configuration details of the computing device, the configuration details comprising details of a hardware configuration of the computing device and a software configuration of the computing device;
   monitoring one or more databases for the update item; and
   transmitting the automated update notification to the agent based on detection of the update item in the one or more databases.

2. The method of claim 1, wherein:
   the configuration details further comprise a network configuration of the computing device; and
   registering the agent comprises subscribing the agent for the automated update notification based on the hardware configuration, the software configuration, and the network configuration of the configuration details.

3. The method of claim 1, further comprising:
   receiving a notification at the cloud provider from the agent indicating a change in one or more of the configuration details;
   updating one or more of the hardware configuration or the software configuration based on the indicated change in the notification; and
   modifying registration of the agent as the recipient of the automated update notification based on the one or more updated hardware configuration or software configuration.

4. The method of claim 3, wherein modifying the registration of the agent as the recipient of the automated update notification comprises:
   unsubscribing the agent for updates for hardware removed in the updated hardware configuration and software removed in the updated software configuration;
   subscribing the agent for updates based on hardware added in the updated hardware configuration and software added in the updated software configuration; and
   providing the agent with the automated update notification when a subscribed to update is detected.

5. The method of claim 1, further comprising generating a cluster configuration for the computing device based on the configuration details, wherein:
   the update item comprises one of a set of mandatory updates or a set of recommended updates based on and for the cluster configuration,
   registering the agent as the recipient of the automated update notification comprises:
      automatically registering the agent as the recipient of an automated mandatory update notification based on the set of mandatory updates; and
      automatically registering the agent as the recipient of an automated optional update notification based on the set of recommended updates and an administrator input.

6. The method of claim 1, further comprising providing the update item to an administrator of the computing device.

7. The method of claim 1, wherein registering the agent as the recipient for the automated update notification based on a selection of one or more updates comprises:
   determining that the agent is already registered as the recipient for the automated update notification; and
   preventing a second registration of the agent with the cloud provider.

8. The method of claim 1, further comprising:
   applying a machine learning (ML) model to the configuration details of the computing device to identify the related update item,
   wherein the ML model is trained based on records, for previously notified recipients, that include hardware and software configurations for corresponding computing devices and update items for which automated update notifications were provided to the previously notified recipients.

9. A system, comprising one or more processors and a memory storing instructions that, when executed by the one or more processors, cause the system to perform a method of providing automated update notifications, the method comprising:
   receiving, by a cloud provider, a request to manage updates for a computing device communicating with the cloud provider via a network;
   identifying a hardware configuration of the computing device, a software configuration of the computing device, and a network configuration of the computing device;
   subscribing an agent as a recipient for an automated update notification with the cloud provider based on the hardware configuration, the software configuration, and the network configuration, wherein the cloud provider provides the automated update notification to the subscribed agent based on detection of an update item related to an aspect of one or more of the hardware configuration, the software configuration, and the network configuration;
   monitoring one or more databases for the update item; and
   providing the agent with the automated update notification when a subscribed to update is detected based on detection of the update item in the one or more databases.

10. The system of claim 9, wherein the method further comprises:
    receiving a notification at the cloud provider from the agent indicating a change in one or more of the hardware configuration or the software configuration;

updating one or more of the hardware configuration or the software configuration based on the indicated change in the notification; and modifying subscription of the agent as the recipient of the automated update notification based on the one or more updated hardware configuration or software configuration.

11. The system of claim 10, wherein modifying subscription of the agent as the recipient of the automated update notification comprises:

unsubscribing the agent for updates for hardware removed in the updated hardware configuration or software removed in the updated software configuration;

subscribing the agent for updates based on hardware added in the updated hardware configuration or software added in the updated software configuration; and providing the agent with the automated update notification when a subscribed to update is detected.

12. The system of claim 9, wherein the method further comprises generating a cluster configuration for the computing device based on the hardware configuration and the software configuration, wherein:

the update item comprises one of a set of mandatory updates or a set of recommended updates based on and for the cluster configuration, subscribing the agent as the recipient of the automated update notification comprises:

automatically registering the agent as the recipient of an automated mandatory update notification based on the set of mandatory updates; and automatically registering the agent as the recipient of an automated optional update notification based on the set of recommended updates and an administrator input.

13. The system of claim 9, wherein the update item comprises one or more of an updated hardware compatibility list, a software update, a firmware update, a driver update, a new or updated relevant article, or a new or updated relevant post.

14. The system of claim 9, wherein subscribing an agent as a recipient for the automated update notification based on the hardware configuration, the software configuration, and the network configuration comprises:

determining that the agent is already registered as the recipient for the automated update notification; and preventing a second registration of the agent with the cloud provider.

15. The system of claim 9, wherein the method further comprises:

applying a machine learning (ML) model to the hardware configuration of the computing device and the software configuration of the computing device to identify the related update item, wherein the ML model is trained based on records, for previously notified recipients, that include hardware and software configurations for corresponding computing devices and update items for which automated update notifications were provided to the previously notified recipients.

16. A non-transitory computer-readable medium comprising instructions that, when executed by one or more processors of a computing system, cause the computing system to perform a method of providing automated update notifications, the method comprising:

registering an agent as a recipient with a cloud provider for an automated update notification based on an identified hardware configuration and software configuration of a computing device communicating with the cloud provider, wherein the cloud provider provides the automated update notification to the registered agent based on detection of an update item related to an aspect of one or more of the hardware configuration or the software configuration;

receiving a notification at the cloud provider from the agent indicating a change in one or more of the hardware configuration or the software configuration;

updating one or more of the hardware configuration or the software configuration based on the indicated change in the notification;

modifying registration of the agent as the recipient of the automated update notification based on the one or more updated hardware configuration or software configuration;

monitoring one or more databases for the update item; and transmitting the automated update notification to the agent based on detection of the update item in the one or more databases.

17. The non-transitory computer-readable medium of claim 16, wherein registering the agent as a recipient for the automated update notification comprises:

subscribing the agent for updates based on the hardware configuration and the software configuration; and providing the agent with the automated update notification when a subscribed to update is detected based on the detection of the update item.

18. The non-transitory computer-readable medium of claim 17, wherein modifying the registration of the agent as the recipient of the automated update notification comprises:

unsubscribing the agent for updates for hardware removed in the updated hardware configuration or software removed in the updated software configuration;

subscribing the agent for updates based on hardware added in the updated hardware configuration or software added in the updated software configuration; and providing the agent with the automated update notification when a subscribed to update is detected.

19. The non-transitory computer-readable medium of claim 16, wherein the method further comprises generating a cluster configuration for the computing device based on the hardware configuration and the software configuration, wherein:

the update item comprises one of a set of mandatory updates or a set of recommended updates based on and for the cluster configuration, registering the agent as a recipient of an automated update notification comprises:

automatically registering the agent as the recipient of an automated mandatory update notification based on the set of mandatory updates; and automatically registering the agent as the recipient of an automated optional update notification based on the set of recommended updates and an administrator input.

20. The non-transitory computer-readable medium of claim 16, wherein the method further comprises:

applying a machine learning (ML) model to the hardware configuration of the computing device and the software configuration of the computing device to identify the related update item, and wherein:

the ML model is trained based on records, for previously notified recipients, that include hardware and software configurations for corresponding computing devices and update items for which automated update notifications were provided to the previously notified recipients, and the update item comprises one or more of an updated hardware compatibility list, a software update, a firmware update, a driver update, a new or updated relevant article, or a new or updated relevant post.

\* \* \* \* \*